(12) United States Patent
Jennings

(10) Patent No.: US 8,757,009 B2
(45) Date of Patent: Jun. 24, 2014

(54) FUEL DISPENSER FLOW METER SENSOR FRAUD PREVENTION

(75) Inventor: Michael Lawrence Jennings, Billericay (GB)

(73) Assignee: Danaher UK Industries Limited, Sheffield (GB)

( * ) Notice: Subject to any disclaimer, the term of this patent is extended or adjusted under 35 U.S.C. 154(b) by 412 days.

(21) Appl. No.: 13/313,894

(22) Filed: Dec. 7, 2011

(65) Prior Publication Data

US 2012/0150344 A1 Jun. 14, 2012

Related U.S. Application Data

(60) Provisional application No. 61/421,011, filed on Dec. 8, 2010.

(51) Int. Cl.
*G06F 21/32* (2013.01)
*G06F 21/83* (2013.01)
*G06F 17/00* (2006.01)
*G01F 25/00* (2006.01)

(52) U.S. Cl.
USPC .................. 73/861.77; 73/1.16; 700/244

(58) Field of Classification Search
USPC ............................. 73/861.77, 1.16
See application file for complete search history.

(56) References Cited

U.S. PATENT DOCUMENTS

| | | |
|---|---|---|
| 4,100,400 A | 7/1978 | Callahan et al. |
| 4,728,788 A | 3/1988 | Myers et al. |
| 5,016,187 A | 5/1991 | Forkert et al. |
| 5,355,915 A * | 10/1994 | Payne .......................... 141/83 |
| 5,447,062 A | 9/1995 | Kopl et al. |
| 5,596,501 A | 1/1997 | Comer et al. |
| 5,689,071 A | 11/1997 | Ruffner et al. |
| 6,067,476 A | 5/2000 | Siler |
| 6,092,410 A | 7/2000 | Kaehler et al. |
| 6,109,477 A | 8/2000 | Myers et al. |
| 6,118,271 A | 9/2000 | Ely et al. |
| 6,119,110 A | 9/2000 | Carapelli |

(Continued)

FOREIGN PATENT DOCUMENTS

| | | |
|---|---|---|
| EP | 0626566 A1 | 11/1994 |
| FR | 2681134 A1 | 3/1993 |

OTHER PUBLICATIONS

International Search Report and Written Opinion, issued May 25, 2012, for corresponding PCT Application No. PCT/EP2011/072234 (13 pgs.).

(Continued)

*Primary Examiner* — Lisa Caputo
*Assistant Examiner* — Jamel Williams
(74) *Attorney, Agent, or Firm* — Nelson Mullins Riley & Scarborough, LLP

(57) ABSTRACT

Methods and systems for detecting fraud caused by tampering with a fuel flow meter. In one embodiment, the method comprises providing a fuel flow meter for measuring the flow of liquid fuel. The flow meter has at least one shaft supporting a rotor. The method further comprises providing the flow meter with a rotary displacement sensor. Also, the method comprises measuring a first angular position of the shaft upon termination of a first fueling transaction and measuring a second angular position of the shaft upon initiation of a second fueling transaction. Finally, the method comprises comparing data indicative of the first and second shaft angular positions to determine whether fraud has occurred.

32 Claims, 7 Drawing Sheets

(56) References Cited

U.S. PATENT DOCUMENTS

| | | |
|---|---|---|
| 6,250,151 B1 | 6/2001 | Tingleff et al. |
| 6,302,129 B1 | 10/2001 | Van Dewerker |
| 6,311,739 B1 | 11/2001 | Thompson et al. |
| 6,326,781 B1 | 12/2001 | Kunde et al. |
| 6,397,686 B1 | 6/2002 | Taivalkoski et al. |
| 6,463,389 B1 | 10/2002 | Dickson |
| 6,692,535 B2 | 2/2004 | Olivier |
| 6,721,669 B2 | 4/2004 | Kopl et al. |
| 6,788,220 B2 | 9/2004 | Netzer |
| 6,854,342 B2 | 2/2005 | Payne et al. |
| 6,882,941 B2 | 4/2005 | Nanaji et al. |
| 6,935,191 B2 | 8/2005 | Olivier et al. |
| 6,996,485 B2 | 2/2006 | Payne |
| 7,028,561 B2 | 4/2006 | Robertson et al. |
| 7,076,330 B1 | 7/2006 | Dickson |
| 7,111,520 B2 | 9/2006 | Payne et al. |
| 7,523,660 B2 | 4/2009 | Albrecht et al. |
| 7,546,778 B2 | 6/2009 | Amante et al. |
| 8,342,199 B2 * | 1/2013 | Deline et al. ............... 137/15.04 |
| 2007/0129905 A1 | 6/2007 | Larsson et al. |
| 2008/0290152 A1 | 11/2008 | Lundgren et al. |
| 2009/0058641 A1 | 3/2009 | DeMarco |
| 2010/0122990 A1 | 5/2010 | Carapelli |
| 2010/0139782 A1 * | 6/2010 | Deline et al. ............... 137/87.03 |
| 2010/0262385 A1 | 10/2010 | Chen et al. |
| 2011/0094287 A1 * | 4/2011 | Nanaji et al. .................. 73/1.36 |
| 2011/0148399 A1 * | 6/2011 | Amante et al. ........... 324/207.11 |
| 2011/0191037 A1 * | 8/2011 | Oldham et al. ................ 702/45 |
| 2011/0233392 A1 * | 9/2011 | Amante .................. 250/231.13 |
| 2012/0150344 A1 * | 6/2012 | Jennings ....................... 700/244 |
| 2013/0110286 A1 * | 5/2013 | Williams et al. ............. 700/244 |
| 2013/0126553 A1 * | 5/2013 | Williams ........................ 222/71 |

OTHER PUBLICATIONS

Results of Partial International Search for Corresponding International Application No. PCT/EP2011/072234, dated Apr. 10, 2012.

* cited by examiner

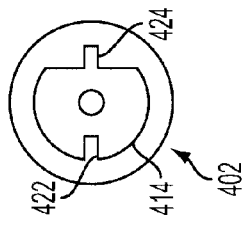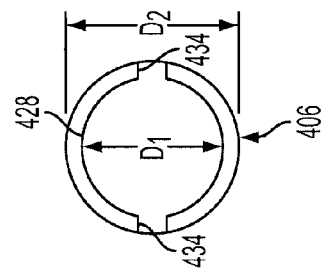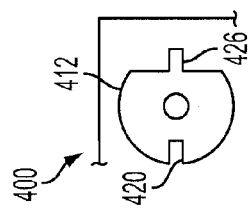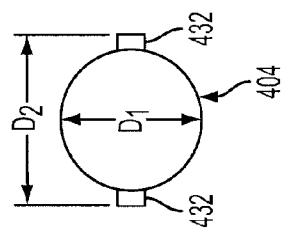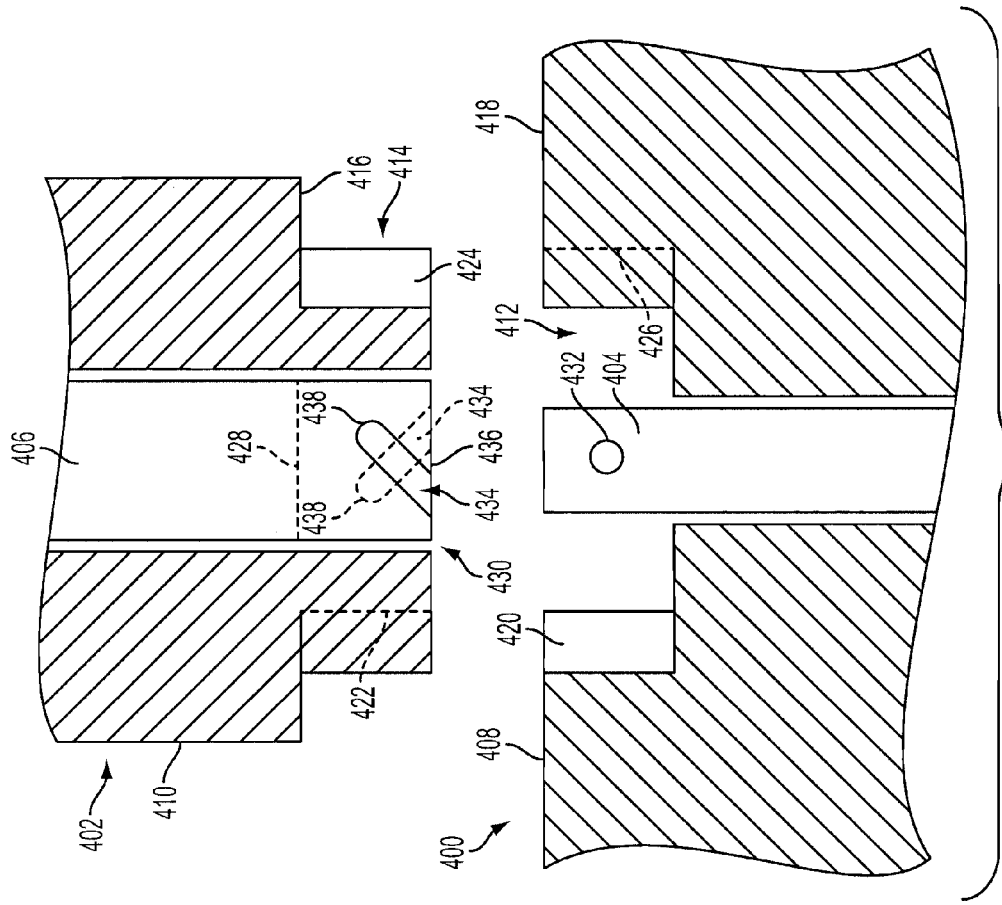

FUEL DISPENSER FLOW METER SENSOR FRAUD PREVENTION

PRIORITY CLAIM

This application claims the benefit of provisional application Ser. No. 61/421,011, filed Dec. 8, 2010, which is hereby relied upon and incorporated herein by reference for all purposes.

FIELD OF THE INVENTION

The present invention relates generally to fuel dispensers. More specifically, the invention relates to detection and prevention of fraud caused by tampering with a fuel flow meter associated with a fuel dispenser.

BACKGROUND OF THE INVENTION

Fuel dispensers in retail service station environments include flow meters that measure the volumetric flow rate of fuel as it is dispensed. Such flow meters are typically required to comply with weights and measures regulatory requirements that mandate a high level of accuracy. This ensures that the customer is neither overcharged nor undercharged for the fuel purchase. Typically, either positive displacement meters or inferential meters have been used for this purpose.

In modern service station fuel dispensers, a control system processes signals generated by a displacement sensor to monitor the amount of fuel delivered to a customer's vehicle. One displacement sensor for this purpose is referred to as a pulser. Pulsers are typically variable reluctance sensors operatively connected to the flow meter to measure rotation of a flow meter shaft. As fuel is dispensed, causing the shaft to rotate, the pulser generates a pulse train. Each pulse represents a known volume of fuel (e.g., 0.001 gallons) passing through the meter.

However, other types of sensors have been used to sense flow rate of various fluids, including magnetic sensors and optical sensors. Magnetic sensors often comprise one or more magnets coupled to and rotating with a flow meter shaft. In some sensors, the magnet(s) may be disposed on a disc that attaches via a threaded aperture at an end of the flow meter shaft and is aligned with the shaft longitudinal axis. Magnetic sensors further include a flux detecting device, such as a Hall-effect sensor, to detect shaft rotation speed and direction.

Optical sensors typically comprise a disc with a pattern of transparent and opaque segments which form a number of concentric tracks. The disc rotates through a read head, which may comprise a light source, a mask, and a photodetector. The read head photodetector outputs the light intensity reaching its surface as the disc rotates, thus providing a signal indicative of the motion of the disc.

Attempts have been made to interfere with the displacement sensor on a fuel flow meter in order to modify the calculated volume of fuel dispensed. For example, a dishonest consumer may disconnect the sensor (or one of its components) from the fuel flow meter prior to a fueling transaction. Also, a dishonest consumer may disable either or both of the fuel dispenser or displacement sensor electronics and force fuel through the fuel flow meter.

SUMMARY OF THE INVENTION

According to one aspect, the present invention provides a method for detecting fraud caused by tampering with a fuel flow meter. The method comprises the step of providing a fuel flow meter for measuring the flow of liquid fuel. The flow meter has at least one shaft supporting a rotor. The method further comprises providing the flow meter with a rotary displacement sensor. Also, the method comprises recording data indicative of a first angular position of the shaft upon termination of a first fueling transaction and recording data indicative of a second angular position of the shaft upon initiation of a second fueling transaction. Finally, the method comprises comparing data indicative of the first and second shaft angular positions to determine whether a difference exists.

According to a further aspect, the present invention provides a fuel flow meter comprising a shaft supporting at least one rotor. The fuel flow meter also comprises a rotary displacement sensor comprising at least one sensing element, a processor, and memory. The displacement sensor is adapted to store first data indicative of an angular position of the shaft in the memory upon termination of a first fueling transaction. The displacement sensor is further adapted to generate second data indicative of an angular position of the shaft upon initiation of a second fueling transaction. Finally, the processor is adapted to compare the first and second data to determine whether a difference exists.

In another aspect, the present invention provides a fuel dispenser comprising a control system having control system memory and internal fuel flow piping adapted for connection to a fuel flow path from a bulk storage tank (e.g., an underground storage tank) to a nozzle. The fuel dispenser further comprises a fuel flow meter having a shaft, wherein said fuel flow meter is located along the piping. Also, the fuel dispenser comprises a rotary displacement sensor coupled to the fuel flow meter and in communication with the control system, wherein the displacement sensor comprises displacement sensor memory. The displacement sensor is adapted to determine data indicative of the angular position of the shaft, and the data indicative of the angular position is stored in both the control system memory and the displacement sensor memory.

According to a further aspect, the present invention provides a fuel flow meter comprising a shaft supporting at least one rotor and a rotary displacement sensor comprising a processor and memory. The displacement sensor comprises an optical encoder adapted to output an expected number of position signals per revolution of the shaft and one or more reference signals per revolution of the shaft. Also, the displacement sensor is adapted to store data indicative of the position signals and the one or more reference signals in memory. Finally, the displacement sensor is adapted to compare a first number of position signals received after receiving a reference signal before termination of a first fueling transaction and a second number of position signals received after initiation of a second fueling transaction to the expected number of position signals to determine whether fraud has occurred.

In accordance with another aspect, the present invention provides a method for detecting fraud caused by tampering with a fuel flow meter. The method for detecting fraud comprises providing a fuel flow meter for measuring the flow of liquid fuel, the flow meter having a housing and at least one shaft supporting a rotor. Also, the method comprises providing the flow meter with a rotary displacement sensor having a housing and a shaft. Further, the method comprises providing a first coupling between the flow meter shaft and the rotary displacement sensor shaft. Notably, the first coupling is operative to cause one of the rotary displacement sensor shaft and the flow meter shaft to rotate relative to the other of the rotary displacement sensor shaft and the flow meter shaft upon removal of the rotary displacement sensor from the flow meter housing.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 7A is a partial cross-sectional view illustrating a coupling between a flow meter and a displacement sensor and their respective shafts according to one embodiment of the present invention.

FIG. 7B is a partial top view of the flow meter of FIG. 7A.

FIG. 7C is a bottom view of the displacement sensor of FIG. 7A.

FIG. 7D is a top view of the flow meter shaft of FIG. 7A.

FIG. 7E is a bottom view of the encoder shaft of FIG. 7A.

Figure 1:
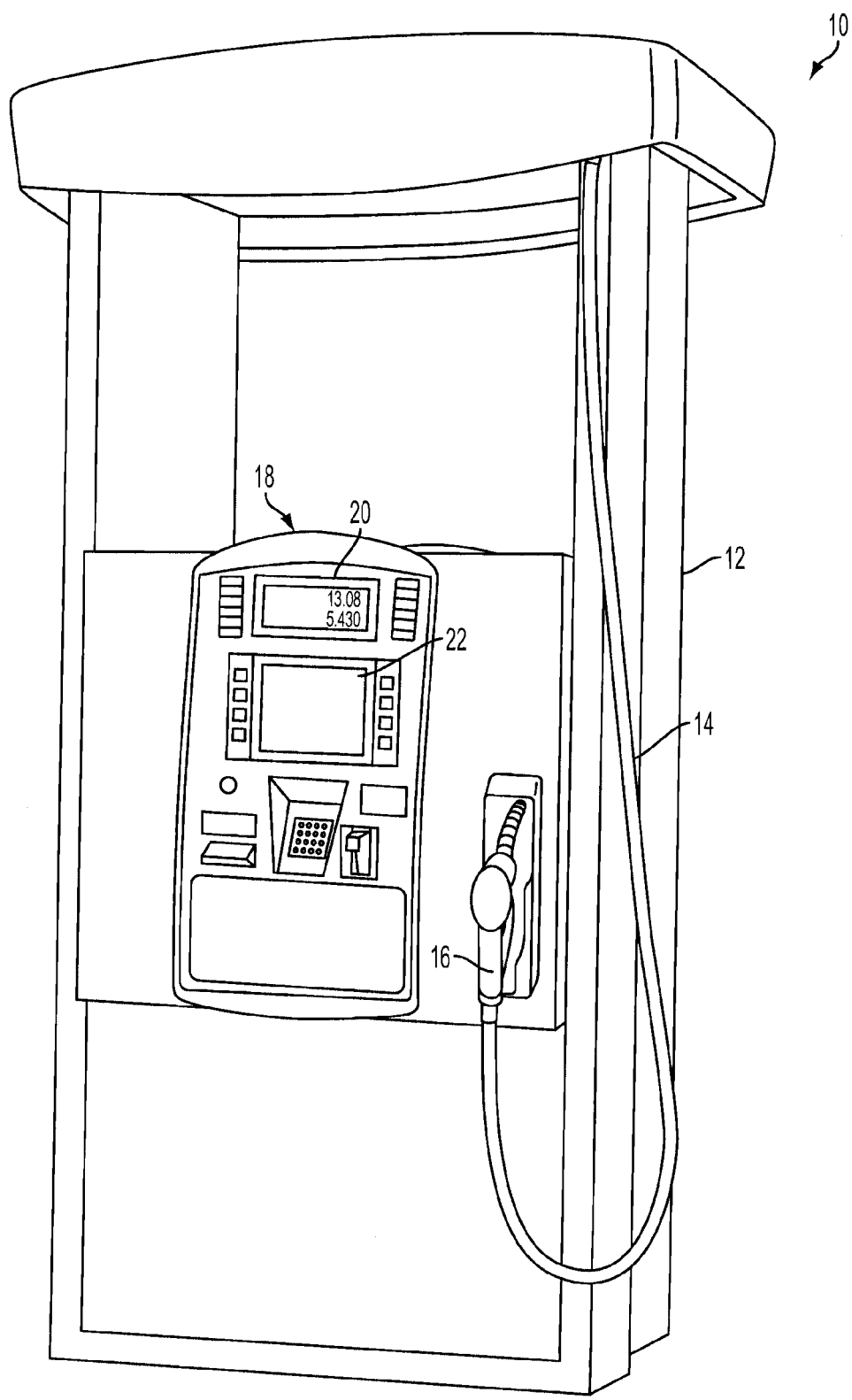
FIG. 1 is perspective view of an exemplary fuel dispenser according to one embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention relate to detection and prevention of fraud caused by tampering with a fuel flow meter associated with a fuel dispenser. Generally, the fuel flow meter comprises a rotary displacement sensor capable of determining the absolute shaft angle of the flow meter. Data indicative of the shaft angle may be stored in one or more memory devices, for example at the end of each fueling transaction. Then, at the beginning of a new transaction or when power is applied to the dispenser, for example, an algorithm may be run to ascertain the current shaft angle. The algorithm may then compare the detected shaft angle to the shaft angle previously stored in memory. As discussed below, if fraud has occurred during the time between when data indicative of the shaft angle is stored in memory and when the algorithm is run, it is likely that the current shaft angle will differ from the previously stored shaft angle. In this case, appropriate action may be taken to alert the operator that fraud has occurred, such as generating an alarm or disabling the fuel dispenser.

It is contemplated that the present invention may be used with many types of rotary displacement sensors. Thus, as used below, the term "displacement sensor" comprises any device which converts shaft angular position to an analog or digital signal that can be detected and further processed. The term includes, but is not limited to, any type of noncontact rotary position sensor or encoder. In preferred embodiments, the rotary displacement sensor is an absolute sensor. Further, as described in more detail below, the present invention may be used with both positive displacement and inferential fuel flow meters.

Referring now to FIG. 1, a perspective view of an exemplary fuel dispenser 10 is provided according to one embodiment of the present invention. For example, fuel dispenser 10 may be the ENCORE® fuel dispenser sold by Gilbarco Inc. of Greensboro, N.C., U.S.A. Those of skill in the art will appreciate, however, that the present invention may be used with flow meters in any fuel dispenser.

Fuel dispenser 10 includes a housing 12 with at least one flexible fuel hose 14 extending therefrom. Fuel hose 14 terminates in a manually-operated nozzle 16 adapted to be inserted into a fill neck of a vehicle's fuel tank. Nozzle 16 includes a fuel valve. Various fuel handling components, such as valves and meters, are also located inside of housing 12. These fuel handling components allow fuel to be received from underground piping and delivered through hose 14 and nozzle 16 to a vehicle's tank, as is well understood.

The fuel dispenser 10 has a customer interface 18. Customer interface 18 may include an information display 20 that shows the amount of fuel dispensed and the price of the dispensed fuel. Further, customer interface 18 may include a media display 22 to provide advertising, merchandising, and multimedia presentations to a customer in addition to basic transaction functions. The graphical user interface provided by the dispenser allows customers to purchase goods and services other than fuel at the dispenser. The dispenser also preferably includes a payment card reader to allow the customer to pay for the fuel at the dispenser.

Figure 2:
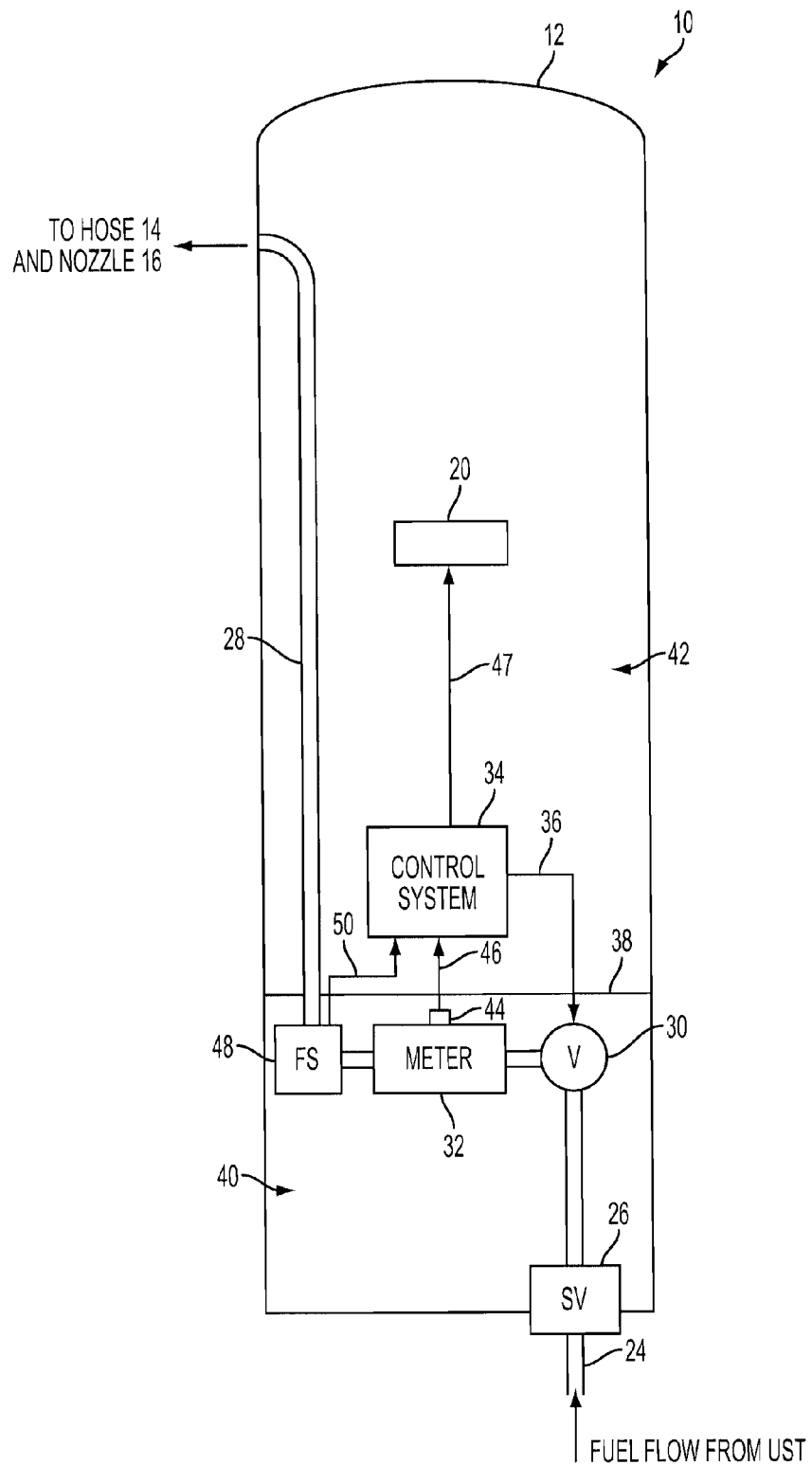
FIG. 2 is a schematic diagram of internal fuel flow components of the fuel dispenser of FIG. 1 according to one embodiment of the present invention.

FIG. 2 is a schematic illustration of exemplary internal fuel flow components of fuel dispenser 10. In general, fuel may travel from an underground storage tank (UST) via main fuel piping 24, which may be a double-walled pipe having secondary containment as is well known, to fuel dispenser 10 and nozzle 16 for delivery. An exemplary underground fuel delivery system is illustrated in U.S. Pat. No. 6,435,204 to White et al., hereby incorporated by reference in its entirety for all purposes. In many cases, a submersible turbine pump (STP) associated with the UST is used to pump fuel to the fuel dispenser 10. However, some fuel dispensers may be equipped with a pump and motor within housing 12 to draw fuel from the UST to the fuel dispenser 10.

Main fuel piping 24 may pass into housing 12 first through shear valve 26. As is well known, shear valve 26 is designed to close the fuel flow path in the event of an impact to fuel dispenser 10. U.S. Patent App. Pub. No. 2006/0260680 to Reid et al., now U.S. Pat. No. 7,946,309, hereby incorporated by reference in its entirety for all purposes, discloses an exemplary secondarily-contained shear valve adapted for use in service station environments. Shear valve 26 contains an internal fuel flow path to carry fuel from main fuel piping 24 to internal fuel piping 28, which may also be double-walled.

After fuel exits the outlet of the shear valve 26 and enters into the internal fuel piping 28, it may encounter a flow control valve 30 positioned upstream of a flow meter 32. In some fuel dispensers, the valve 30 may be positioned downstream of the flow meter 32. The valve 30 may preferably be a proportional solenoid controlled valve, such as described in U.S. Pat. No. 5,954,080 to Leatherman, hereby incorporated by reference in its entirety for all purposes.

Flow control valve 30 is under control of a control system 34 via a flow control valve signal line 36. Control system 34 may be a suitable microprocessor, microcontroller, or other electronics with associated memory and software programs running thereon. In this manner, the control system 34 can control the opening and closing of the flow control valve 30 to either allow fuel to flow or not flow through meter 32 and on to hose 14 and nozzle 16.

Flow control valve 30 is located below a vapor barrier 38 delimiting a hydraulics compartment 40 of the fuel dispenser 10. The control system 34 is typically located in an electronics compartment 42 of fuel dispenser 10 above vapor barrier 38. In this embodiment, after fuel exits flow control valve 30, it flows through meter 32, which measures the volume and/or flow rate of the fuel.

Flow meter 32 may preferably be a positive displacement or inferential flow meter having one or more rotors which rotate on one or more shafts. Examples of positive displacement flow meter technology which may be modified for use with the present invention are provided in U.S. Pat. No. 6,250,151 to Tingleff et al., U.S. Pat. No. 6,397,686 to Taivalkoski et al., and U.S. Pat. No. 5,447,062 to Köpl et al., each of which is hereby incorporated by reference in its entirety for all purposes. Likewise, examples of inferential flow meter technology with may be modified for use with the present invention are provided in U.S. Pat. No. 7,111,520 to Payne et al. and U.S. Pat. No. 5,689,071 to Ruffner et al. and U.S. Patent App. Pub. No. 2010/0122990 to Carapelli.

Meter 32 comprises a rotary displacement sensor 44 that generates a signal indicative of the volumetric flow rate of fuel and periodically transmits the signal to control system 34 via a signal line 46. In this manner, the control system 34 can update the total gallons dispensed and the price of the fuel dispensed on information display 20 via a communications line 47.

As fuel leaves flow meter 32 it enters a flow switch 48. Flow switch 48, which preferably includes a one-way check valve that prevents rearward flow through fuel dispenser 10, provides a flow switch communication signal to control system 34 via the flow switch signal line 50. The flow switch communication signal indicates to control system 34 that fuel is actually flowing in the fuel delivery path and that subsequent signals from flow meter 32 are due to actual fuel flow.

After the fuel leaves flow switch 48, it exits through internal fuel piping 28 to be delivered through fuel hose 14 and nozzle 16 for delivery to the customer's vehicle.

As noted above, embodiments of the present invention advantageously provide a fuel flow meter with a rotary displacement sensor capable of determining the absolute angle of the flow meter shaft. Thus, the rotary displacement sensor may preferably be an absolute, as opposed to an incremental, sensor.

Incremental displacement sensors indicate the amount of change between a previous position of a shaft and the present position of the shaft. If a power loss or other disturbance, such as an error in signal transmission, causes information regarding the present position to be lost, an incremental sensor must be reset to place the sensor in a reference position. In contrast, absolute displacement sensors are capable of measuring the shaft's position relative to a predetermined point, rather than from a previous position. After a power loss when power is restored, an absolute sensor indicates the current sensor position without the need to be moved to a reference position.

Those of skill in the art are able to identify suitable rotary displacement sensor technologies. As an example, the following companies offer rotary displacement sensor technology: Eltomatic A/S of Denmark and Metrom, LLC of Lake Zurich, Ill. In a preferred embodiment, the rotary displacement sensor may be a magnetic displacement sensor. Commercially available magnetic displacement sensor technologies that may be suitable for use in embodiments of the present invention include magnetoresistive, hall effect, inductive, and magnetic encoders. However, non-magnetic displacement sensors, such as optical or mechanical encoders, may also be used.

Magnetic displacement sensors may typically comprise one or more permanent magnets coupled to a rotating shaft to apply a variable magnetic field over a sensing element and obtain a response indicating angular position. In some cases, the magnet(s) may be disposed on a disc coupled to the shaft and centered on the shaft's longitudinal axis. (See, e.g., U.S. Pat. No. 7,546,778 to Amante et al., hereby incorporated by reference in its entirety for all purposes.) Other displacement sensors may comprise one or more sensing elements positioned over a magnetic rotor having at least one region of discontinuity defined in its outer circumferential surface such that the rotor generates a characteristic magnetic flux. (See, e.g., U.S. Pat. No. 6,397,686 to Taivalkoski et al.)

In many cases, the sensing element may be packaged as an integrated circuit. Further, the sensing element may provide a variety of outputs indicative of angular position, such as a multi-bit digital word for each distinct shaft angle, analog sine and cosine voltage outputs, or a change in electrical resistance. The absolute displacement sensor preferably has a high measurement resolution.

Figure 3:
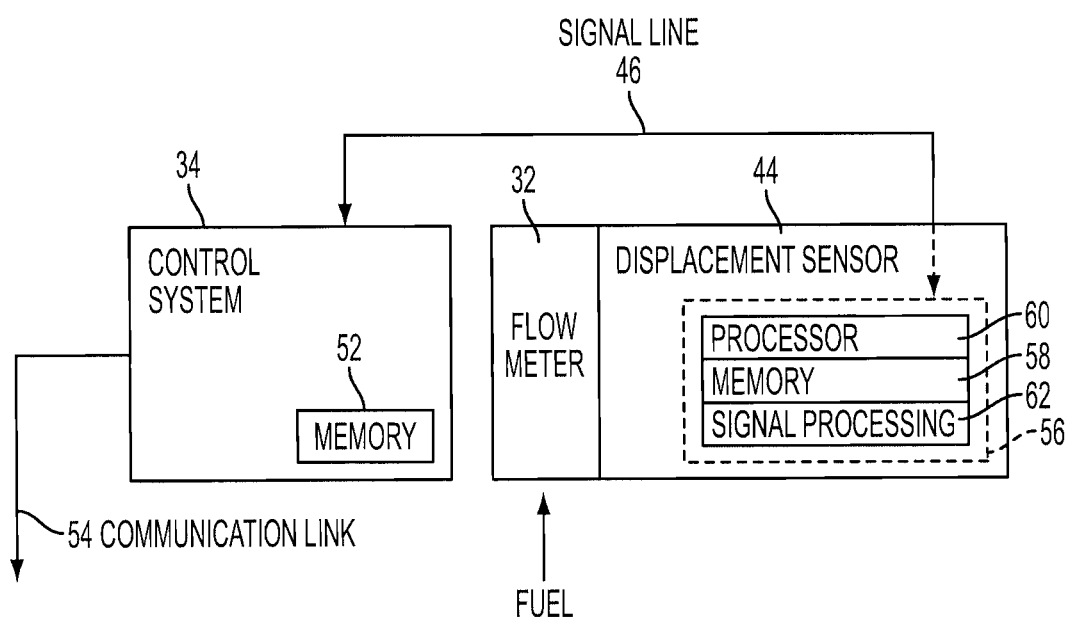
FIG. 3 is a schematic diagram illustrating the relationship between the control system, flow meter, and displacement sensor according to one embodiment of the present invention.

In this regard, FIG. 3 is a schematic diagram illustrating the relationship between control system 34, fuel flow meter 32, and displacement sensor 44 according to one embodiment of the present invention. For example, control system 34, which preferably comprises memory 52, may typically control various aspects of fuel dispenser 10, such as valves, displays, and the like as is well understood. Control system 34 may be communicably coupled via signal line 46 to displacement sensor 44, which may be operatively connected to flow meter 32. Thereby, control system 34 may communicate with displacement sensor 44 to obtain data regarding operation of flow meter 32, described in more detail below. In some preferred embodiments, communications between control system 34 and displacement sensor 44 are encrypted using suitable encryption algorithms known to those of skill in the art.

Additionally, in a further aspect, a communication link 54 may provide communication between control system 34 and a site controller or the like. In some embodiments, the site controller functions may preferably be provided by the PASSPORT® point-of-sale system manufactured by Gilbarco Inc. Communication link 54 may be any suitable link for providing communication between control system 34 and the site controller, such as two wire, RS 422, Ethernet, wireless, etc. if needed or desired. By way of communication link 54, control system 34 may communicate any of the data communicated thereto on to the site controller, which may use any of this information for reporting or decision purposes. For example, the site controller may communicate with a remote location for credit/debit card authorization or it may communicate information to a remote location for logging, tracking, or problem identification.

Displacement sensor 44, which may preferably comprise a magnetic rotary encoder adapted to determine absolute shaft position as described above, comprises sensor electronics 56. Sensor electronics 56, which may be formed as one or more programmable logic devices or application-specific integrated circuits (ASICs), preferably comprise memory 58 in electronic communication with a processor 60. Processor 60, which may be a microcontroller, microprocessor, or the like, is adapted to communicate with control system 34 via signal line 46. Thus, for example, processor 60 may read from memory 52 and control system 34 may read from memory 58. It should be understood that processor 60 may preferably include an operating program permanently stored in a read-only memory (ROM), and may also store information temporarily in a random access memory (RAM) on an as-needed basis. Processor 60 may typically employ a variety of conventional items, such as counters, registers, flags, and indexes as necessary or desired.

Further, in some embodiments the sensor electronics may comprise signal processing circuitry. As shown, sensor electronics 56 comprise signal processing circuitry 62. In embodiments where the sensing element outputs analog signals, the signal processing circuitry may comprise an analog to digital converter and/or an interpolator to increase measurement resolution. In addition, other signal processing operations may be performed, such as calculation of flow direction, flow rate from shaft rotation, or correction of measurement error at high or low flow rates. One skilled in the art will appreciate that signal processing circuitry 62 may be incorporated into processor 60.

The flow meter shaft angle is preferably stored in memory at least at the start and end of each transaction to enable a determination of whether the flow meter shaft angle has changed since it was last stored, which may indicate that fraud has occurred. However, the shaft angle may be recorded at any time, including when power is applied to the fuel dispenser after an outage and/or throughout each transaction.

For example, the shaft angle may be stored in the control system memory or the displacement sensor memory. In a preferred embodiment, however, the shaft angle may be stored in both memories (at least at both the start and end of each transaction). Those of skill in the art will appreciate that this may provide an additional safeguard against fraud, in that even where a dishonest consumer modifies the memory of one of the control system and displacement sensor, the correct shaft angle stored at the end of a previous transaction will still be stored in the other's memory. Thus, the fraud may still be detected as described below.

Memory 52 and memory 58 are preferably nonvolatile so that the data is preserved during electrical power loss. Desirable nonvolatile memory types include electronically programmable read only memory (EPROM), electronically erasable programmable read only memory (EEPROM), ferroelectric nonvolatile memory devices, flash memory devices, and other suitable types of alterable nonvolatile memory. The practice of the present invention contemplates using any suitable memory device as necessary or desired.

As noted above, fraud may occur when a perpetrator disconnects a displacement sensor from the fuel flow meter prior to a fueling transaction or disables either or both of the fuel dispenser or displacement sensor electronics and forces fuel through the fuel flow meter. Thus, embodiments of the present invention preferably provide a checking algorithm to determine whether the flow meter, displacement sensor, or controller has been tampered with and fraud has occurred. As described below, either or both of the dispenser control system and the fuel meter displacement sensor may perform the checking algorithm.

Generally, according to one embodiment, the algorithm may output whether a shaft angle detected prior to fuel dispensing, $\Theta_S$, is equal to a shaft angle stored in the control system or displacement sensor memory, $\Theta_E$, at the end of a previous transaction. If not, the control system or displacement sensor may take appropriate action to prevent fraud, such as generating an alarm or the like, disabling the fuel dispenser, and/or notifying appropriate authorities via the communication link.

Figure 4:
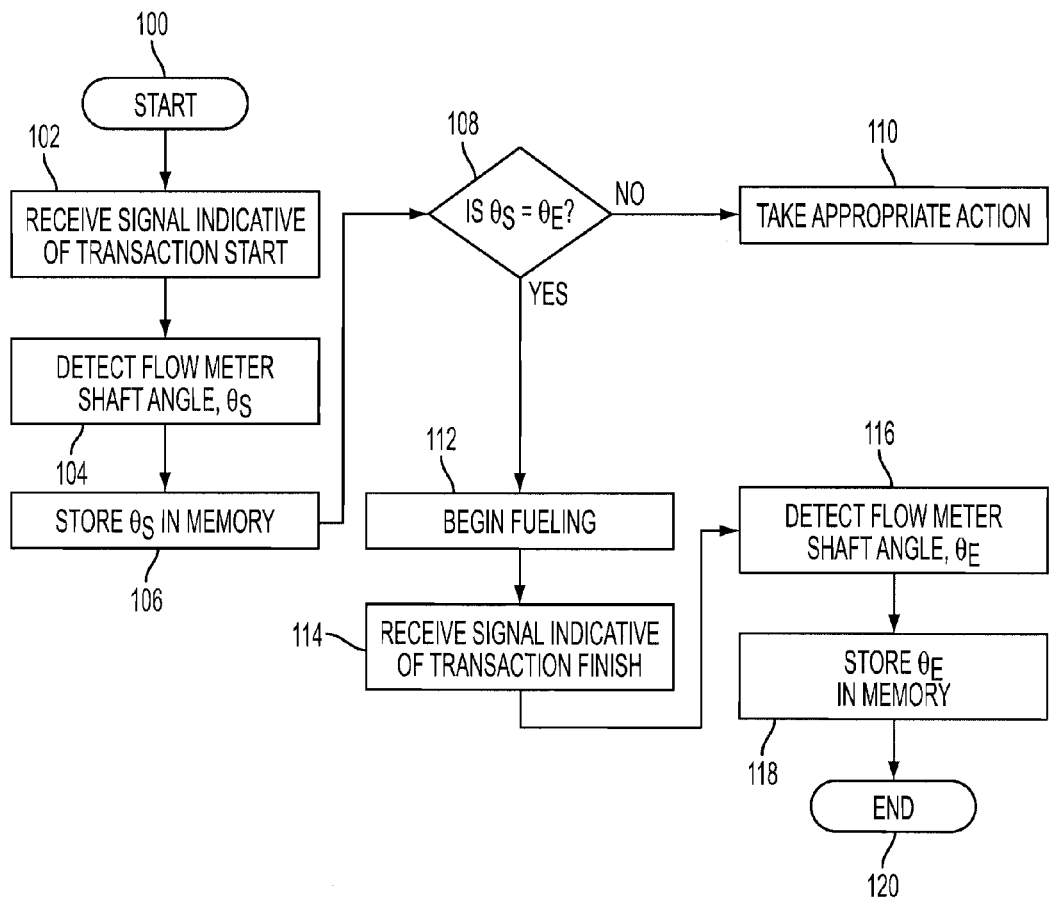
FIG. 4 is a flow chart outlining the operation of the components of FIG. 3 according to one embodiment of the present invention.

In this regard, FIG. 4 is a flow chart outlining the operation of flow meter 32 according to one embodiment of the present invention. The process starts (step 100) and control system 34 receives a signal indicative of the start of a fueling transaction (step 102). For example, control system 34 may receive a signal that a customer has lifted a nozzle pedestal to the "on" position. Those of skill in the art will appreciate, however, that other signals may be used to indicate the start of fueling.

Next, control system 34 may instruct displacement sensor 44 to determine the current shaft angle $\Theta_S$ (step 104). Data indicative of angle $\Theta_S$ may preferably then be stored in both control system memory 52 and displacement sensor memory 58, although in some embodiments the data may only be stored in either memory 52 or memory 58 (step 106).

Then, shaft angle $\Theta_S$ is compared to shaft angle $\Theta_E$ (step 108), which will have previously been stored in memory as described below. Regardless of where the shaft angles $\Theta_S$ and $\Theta_E$ are stored, either control system 34 or displacement sensor 44 may perform this comparison. Those of skill in the art will appreciate that because of the displacement sensor's high measurement resolution, it is exceedingly unlikely that a perpetrator will be able to reset the flow meter shaft and/or magnetic element to a position close enough to $\Theta_E$ to escape detection. Thus, if the values are not equal, either control system 34 or displacement sensor 44 may take appropriate action to report or prevent fraud (step 110). Preferably, however, both control system 34 and displacement sensor 44 may compare the values of $\Theta_S$ and $\Theta_E$ in their respective memories 52, 56. Thereby, either control system 34 or displacement sensor 44 may take appropriate action to report or prevent fraud if the value of $\Theta_E$ differs from the value of $\Theta_S$.

If angles $\Theta_S$ and $\Theta_E$ are equal, the fueling process begins and displacement sensor 44 may measure the position of a shaft of flow meter 32 (step 112). When control system 34 receives a signal indicative of the end of the transaction (step 114), it may instruct displacement sensor 44 to determine the current shaft angle, $\Theta_E$ (step 116). In some embodiments, the displacement sensor may reset this position as the reference point (or "zero position") relative to which it measures angular position each transaction, although this is not required. Finally, shaft angle $\Theta_E$ may be stored in memory (step 118). As noted above, it is preferred that $\Theta_E$ be stored in both control system 34 memory 52 and displacement sensor 44 memory 58. The process then ends (step 120).

In a further embodiment, the above-described process may also be performed when power is applied to a fuel dispenser after an outage. This may be the case, for example, when a perpetrator disconnects the power from a dispenser and forces fuel through the fuel flow meter.

In a further embodiment, the shaft angle $\Theta_E$ may be stored in both the control system and displacement sensor memories and these values may be compared for parity. Those of skill in the art will appreciate that this may provide additional fraud deterrence where a perpetrator attempts to alter one of the control system memory and displacement sensor memory (e.g., to hide the fact that fraud has occurred). Either or both of the control system and the displacement sensor may perform this comparison, preferably at all dispenser states (e.g., when power is applied and the start and end of each transaction, among others). Additionally, a site controller or the like in electronic communication with the fuel dispenser may perform this function. If the comparison does not yield equal shaft angles $\Theta_E$, appropriate action may be taken as described above.

Figure 5:
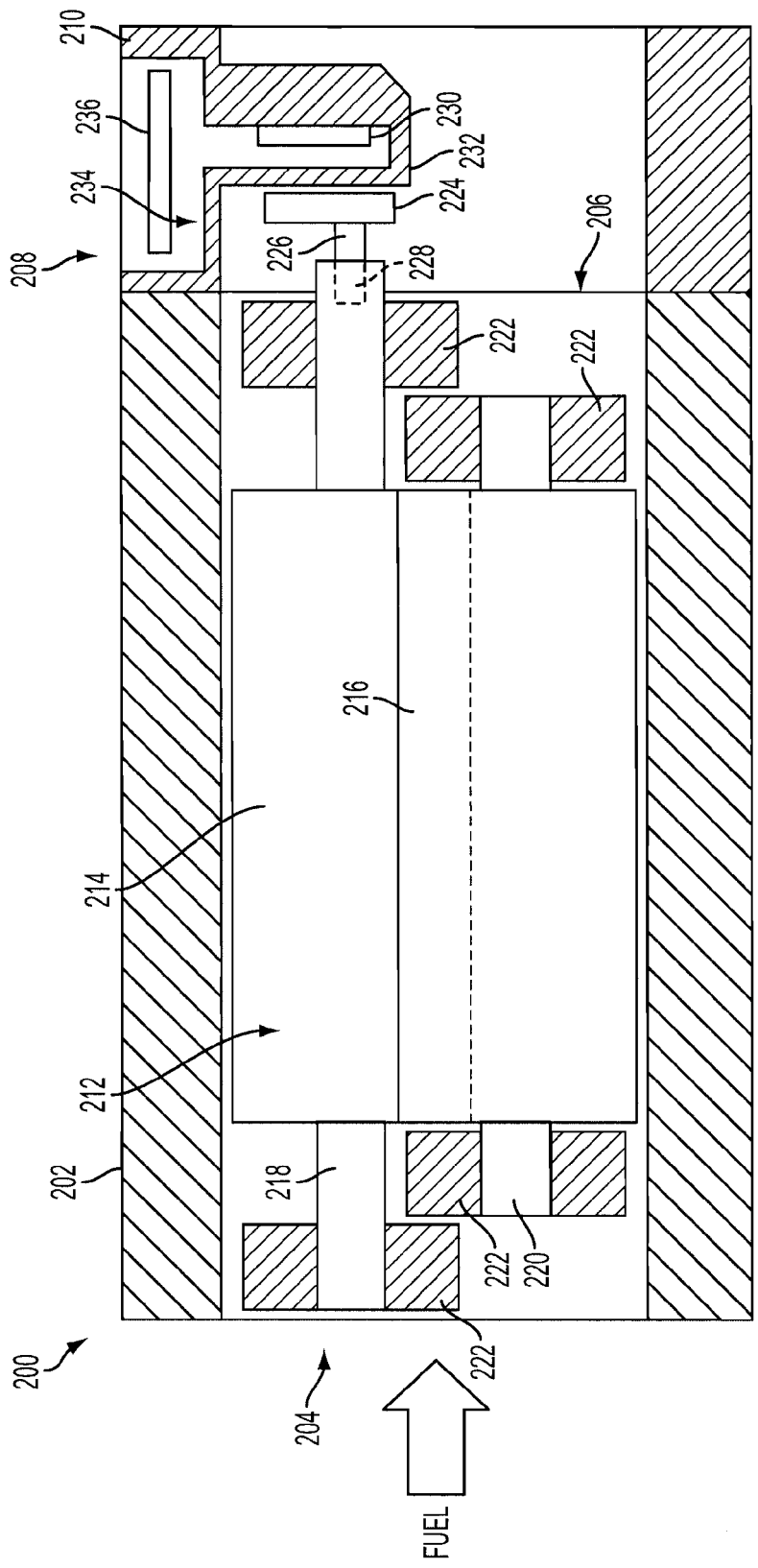
FIG. 5 is a schematic cross-sectional view of a positive displacement flow meter according to one embodiment of the present invention.

FIG. 5 is a schematic cross-sectional view of a positive displacement flow meter according to one embodiment of the present invention. In particular, flow meter 200 comprises a body 202 defining a longitudinal bore therethrough between an inlet 204 and an outlet 206. As shown, flow meter 200 comprises a displacement sensor 208 positioned in a sensor housing 210. Displacement sensor 208 is preferably analogous to displacement sensor 44, described above, and thus displacement sensor 208 may comprise a magnetic encoder. Sensor housing 210 may be removably attached to an end of flow meter 200.

Flow meter 200 further comprises a rotor assembly 212 comprising a pair of screw spindles 214, 216, shown in simplified form to facilitate illustration. Screw spindles 214, 216 may be elongate cylindrical rotors defining a helical blade, and as those of skill in the art will appreciate, spindles 214, 216 may mesh and rotate together. Spindles 214, 216 may rotate on shafts 218, 220, respectively, which are mounted at each end on bearings 222.

Displacement sensor 208, which may preferably be an absolute displacement sensor, comprises a magnetic element 224 which may be coupled to shaft 218 via an encoder shaft 226 (although in other embodiments element 224 may be coupled to shaft 220). For example, in one embodiment, encoder shaft 226 may be operatively connected to magnetic element 224 and threadably received in an axial bore 228 defined in an end of shaft 218. Magnetic element 224, which as shown comprises a disc having one or more magnets disposed thereon, is preferably adapted to apply a variable magnetic field to a sensing element 230 as shafts 218, 226 rotate. However, magnetic element 224 may take other forms, as those of skill in the art will appreciate. In some embodiments, for example, magnetic element 224 may simply be a magnet partially or completely received in a bore defined in an end of shaft 218. Element 224 may also comprise more than one magnet in some embodiments. Sensing element 230, which may comprise an integrated circuit, is preferably adapted to detect the variable magnetic field applied by element 224 and provide outputs indicative of the angular position of shaft 218.

Sensor housing 210 may comprise a radial measurement structure 232 defining an electronics compartment 234 therein. To maintain sensing element 230 isolated from flowing fuel, sensing element 230 may preferably be positioned in electronics compartment 234. Thereby, sensing element 230 may be positioned proximate to and in axial alignment with element 224. Electronics compartment 234 also houses other displacement sensor electronics 236 in electronic communication with sensing element 230. Displacement sensor electronics 236 are preferably analogous to sensor electronics 56 described above, and thus sensor electronics 236 may comprise a processor, memory, and signal processing circuitry. As described above, the sensor electronics 236 may include one or more ASICs.

In operation, fuel may flow from internal fuel dispenser piping into inlet 204. As fuel flows through meter 200, screw spindles 214, 216 rotate on their associated shafts 218, 220. Magnetic element 224 rotates with shaft 218 to apply a varying magnetic field over sensing element 230. Sensing element 230 detects changes in the magnetic field and produces signals indicative of the absolute angular position of shaft 218. Sensor electronics 236 (or, in some embodiments, control system 34) may then process these signals to determine the volume of fuel flowing through meter 200. Further, as described above, the absolute angle of shaft 218 may be stored in memory at various points during a fueling transaction.

In a further embodiment, the displacement sensor may comprise an optical encoder. Incremental optical encoders typically output quadrature signals indicative of the motion of a flow meter shaft to a counter. Signal generation techniques include using geometric masking, Moiré fringing, or diffraction. However, incremental optical sensors are not suitable for storing absolute shaft angular position information. For example, digital output signals from these encoders consist of two square waves 90° out of phase and these signals have only four possible states. Analog signals from these encoders, which consist of sine and cosine signals output a number of times per revolution, are likewise insufficient. Further, problems in signal quality (e.g., quadrature separation and pulse "jitter") can cause errors in encoding.

Some incremental optical encoders may include a reference signal or "check pulse" in a fixed location in order to define a reference position. Because the number of signals per revolution is known, these reference signals have been provided to check for counting errors which can occur due to an error in signal transmission, for example. However, as noted above, if power loss occurs, position information is lost and the sensor must return to the reference position to reset its counter.

Absolute optical encoders, on the other hand, may be suitable for determining and storing absolute shaft angle. Each track on the disc of an absolute optical sensor represents one bit of a binary number. As the disc rotates past a read head, a photodetector outputs a unique digital word for each shaft angle. Absolute optical encoders typically employ Gray code over direct binary coding because with Gray code, only one bit of data changes between representations of two consecutive positions. Those of skill in the art will appreciate, however, that to provide an absolute encoder with sufficient measurement resolution, the encoder should include a disc with a large number of tracks and sophisticated signal processing circuitry. For example, to provide an encoder with a resolution of 0.1° (i.e., $360°/2^{12}$), twelve tracks are needed. Thus, while these encoders are within the scope of the present invention, a less expensive alternative may be preferable for some embodiments.

Thus, according to one embodiment of the present invention, the displacement sensor preferably comprises an optical encoder having a shaft-mounted disc analogous to that of an incremental optical encoder. The encoder disc may be provided with two tracks for analog or digital quadrature output signals and a third track for a reference position output signal. The displacement sensor further comprises sensor electronics which may preferably be analogous to sensor electronics 56. Thus, the sensor electronics may receive a predefined and known number of output signals per revolution of a flow meter shaft. Further, the sensor electronics are preferably adapted to record in nonvolatile memory at the end of a fueling transaction the number of quadrature signals received since the last reference position output signal. This number, $N_E$, is indicative of absolute shaft angle.

Depending on the needs of the operator and the memory available, recording of each output signal may occur for each revolution of the flow meter shaft, for the entire transaction, or for a plurality of transactions. Further, $N_E$ may be recorded in either or both of the control system and displacement sensor memories. Then, if a dishonest customer attempts fraud by disconnecting power or disconnecting the displacement sensor from the flow meter prior to forcing fuel through the fuel flow meter, when a new valid transaction begins the control system and/or displacement sensor will know the angular position of the shaft at the end of the last valid transaction.

In one embodiment, the displacement sensor may count the number, $N_S$, of quadrature output signals received until the next reference position signal is received and transmit this information to the control system. If either or both of the control system and displacement sensor determine that, when subtracted from the expected number of signals per revolution, $N_S$ does not yield a number within one of $N_E$, appropriate action may be taken to prevent or report fraud. As noted above, this may include generating an alarm or the like, disabling the fuel dispenser, and/or notifying appropriate authorities via the communication link. Those of skill in the art will appreciate that this arrangement may be less expensive than traditional absolute optical encoders and thus may be suitable for deployment in a retail fueling environment.

Figure 6:
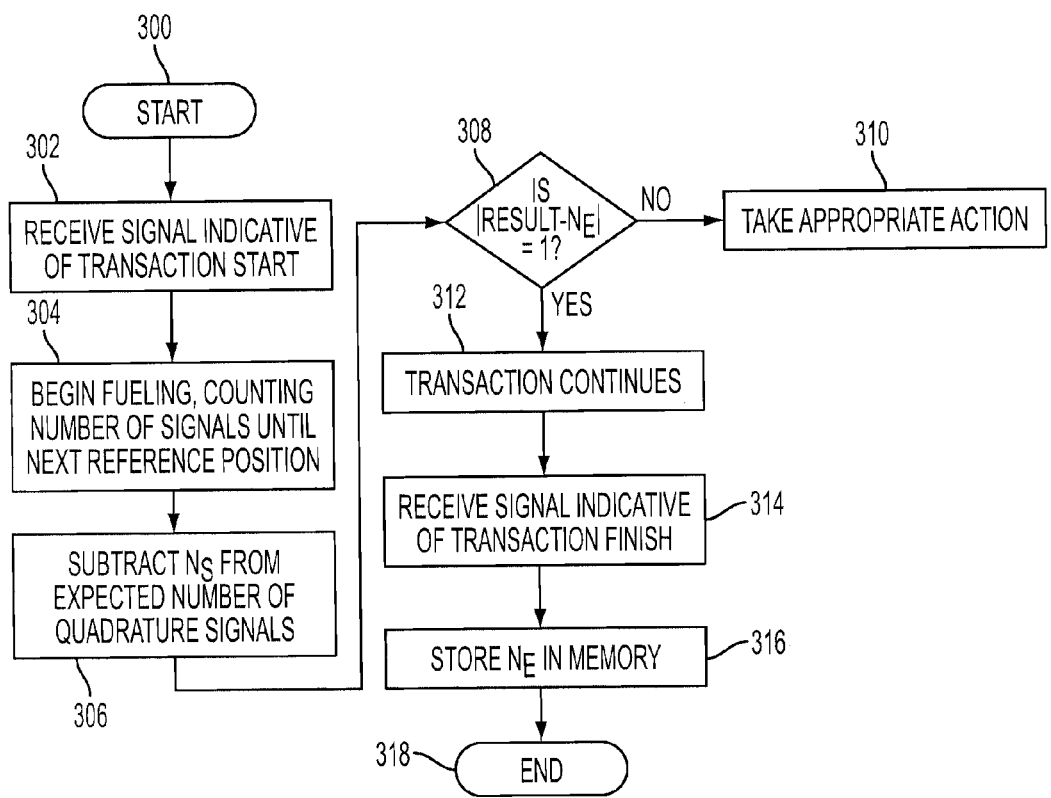
FIG. 6 is a flow chart outlining the operation of a fuel dispenser flow meter having an optical displacement sensor according to one embodiment of the present invention.

FIG. 6 is a flow chart outlining this process according to one embodiment of the present invention. This process may in many respects be similar to the process described with reference to FIG. 4. In particular, the process starts (step 300) and a fuel dispenser control system (preferably analogous to control system 34) receives a signal indicative of the start of a fueling transaction (step 302). Next, as fuel begins to flow through the flow meter, an optical displacement sensor as described above may count the number of quadrature output signals received until the next reference position signal is received (step 304). The result, $N_S$, may be stored in either or both of the control system and displacement sensor memories, where the number of quadrature output signals received since the previous reference position output signal, $N_E$, will have preferably been stored at the end of the previous transaction.

Regardless of where $N_E$ is stored, either or both of the control system and displacement sensor may then perform the following steps. $N_S$ may be subtracted from the expected number of quadrature output signals per revolution of the flow meter shaft (step 306). Then, the result of this calculation may be compared to $N_E$, which has been previously stored in memory (step 308). Specifically, in one embodiment, if the absolute value of the result minus $N_E$ is not equal to one, fueling may be interrupted and appropriate action may be taken to report or prevent fraud (step 310). Those of skill in the art will appreciate that in other embodiments, the values of $N_S$ and $N_E$ may be determined differently, such that the result of the above calculation yields a different expected amount. For example, the outcome could be zero rather than one.

However, in this embodiment, where the calculation yields an answer of one, fueling may not be interrupted and the transaction may continue (step 312). The displacement sensor preferably maintains the count of output signals in memory throughout the transaction. When the control system receives a signal indicative of the end of the transaction (step 314), it may instruct the displacement sensor to store a new value of $N_E$ in memory, and this information may also preferably be stored in the control system memory (step 316). The process then ends (step 318).

In a further embodiment, it may be desirable to force a nonnegligible rotation of an encoder shaft of a displacement sensor when a displacement sensor is removed from a flow meter. As explained below with reference to FIGS. 7A-7E, this may aid in the detection of fraud because it decreases the likelihood that a perpetrator could replace the displacement sensor such that its encoder shaft is in the same angular position as it was before removal.

In this regard, FIG. 7A is a partial cross-sectional view illustrating a coupling between a flow meter 400 and a displacement sensor 402 and their respective shafts 404, 406 according to one embodiment of the present invention. Shafts 404, 406 may rotate in axial bores defined in respective housings 408, 410. To facilitate illustration, flow meter 400 and displacement sensor 402 are decoupled in FIG. 7A. FIG. 7B is a partial top view of flow meter 400 and FIG. 7C is a bottom view of displacement sensor 402. Also, FIG. 7D is a top view of flow meter shaft 404 and FIG. 7E is a bottom view of encoder shaft 406.

According to one embodiment, the coupling may prevent rotation of the displacement sensor housing relative to the flow meter housing when the displacement sensor is removed. For example, flow meter 400 preferably defines a socket 412 adapted to receive a protrusion 414 of displacement sensor 402 such that a bottom surface 416 of displacement sensor housing 410 rests flush against a top surface 418 of flow meter housing 408 when coupled. Socket 412 may preferably be non-round, defining a key 420 adapted to be received in a keyway 422 defined in protrusion 414. Similarly, protrusion 414 may define a key 424 adapted to be received in a keyway 426 defined in socket 412. One skilled in the art will recognize that other suitable methods for preventing relative rotation of the displacement sensor housing 410 and flow meter 400 during removal may be used and are within the scope of the present invention.

At the same time, the coupling may force rotation of one of the encoder shaft and flow meter shaft relative to the other when the displacement sensor is removed. In one example, encoder shaft 406 may define a bore 428 at a proximal end 430 thereof. Bore 428 may preferably have a depth equal to the height of protrusion 414. Also, at least at an end portion thereof equal to the depth of bore 428, flow meter shaft 404 may define a slightly smaller diameter $D_1$ than outer diameter $D_2$ of encoder shaft 406 such that shaft 404 may be snugly received in bore 428 when displacement sensor 402 is coupled to flow meter 400.

Further, flow meter shaft 404 may include pins 432 diametrically opposed on its periphery. The diametric distance between the distal ends of pins 432 may be equal to diameter $D_2$. In addition, encoder shaft 406 may define slots 434 extending in an upward helical fashion from bottom edge 436 and adapted to receive pins 432 when shafts 404, 406 are coupled together. In one embodiment, slot 434 may travel through 90° of rotation from the bottom edge 436 to its terminus 438. Thus, when displacement sensor 402 is coupled to flow meter 400, flow meter shaft 404 may be inserted into bore 428 of encoder shaft 406 in a twisting motion as pins 432 follow the rotation of slot 434.

A greater torque is preferably required to rotate flow meter shaft 404 than to rotate encoder shaft 406. Thus, when displacement sensor 402 is removed from flow meter 400, it will be appreciated that encoder shaft 406 may be forced to rotate in a clockwise direction while flow meter shaft 404, flow meter 400, and the housing 410 of displacement sensor 402 remain stationary.

Because shaft 406 has changed position, it will be extremely difficult, if not impossible, for a dishonest customer to replace displacement sensor 402 with shaft 406 in the same position as prior to removal. It will also be appreciated that because of the coupling between socket 412 and protrusion 414, shafts 404, 406 are inaccessible until displacement sensor 402 is decoupled from flow meter 400. Thus, a dishonest customer cannot lock either shaft to prevent rotation during removal of displacement sensor 402.

Additionally, in a further embodiment, the optical encoder disc or magnetic element (depending on the type of displacement sensor used) may be coupled to encoder shaft 406 via a one-way clutch which transmits torque in only one direction of rotation. In other words, shaft 406 may transmit torque when rotated clockwise but may "freewheel" when rotated counterclockwise. Thereby, reassembly cannot reproduce the exact prior angular position of the optical encoder disc or magnetic element because it will not turn as displacement sensor 402 is replaced (although shaft 406 will turn). Those of skill in the art can select a suitable one-way clutch, such as a roller clutch or the like.

In a further embodiment, the above-described physical couplings between flow meter 400/displacement sensor 402 and flow meter shaft 404/encoder shaft 406 may be reversed. In particular, when displacement sensor 402 is coupled to or decoupled from flow meter 400, a physical screw or bayonet fitting may force rotation of displacement sensor 402 relative to flow meter 400. At the same time, shafts 404, 406 may be coupled in a manner that prevents relative rotation during attachment and removal of displacement sensor 402. For example, pins 432 and slots 434 may not be provided and shafts 404, 406 may be coupled using keys and keyways as described above. As a result, the relative position of the sensor element inside the housing 410 and the optical encoder disc (or magnetic element) will change. Those of skill in the art will appreciate that this embodiment may provide maintenance advantages in some applications.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for detecting fraud caused by tampering with a fuel flow meter, comprising the steps of:
   providing a fuel flow meter for measuring the flow of liquid fuel, said flow meter having at least one shaft supporting a rotor;
   providing said flow meter with a rotary displacement sensor;
   recording data indicative of a first angular position of said shaft upon termination of a first fueling transaction;
   recording data indicative of a second angular position of said shaft upon initiation of a second fueling transaction; and
   comparing data indicative of said first and second shaft angular positions to determine whether a difference exists.

2. The method of claim 1, further comprising receiving a signal indicative of the termination of said first fueling transaction.

3. The method of claim 2, further comprising receiving a signal indicative of the initiation of said second fueling transaction.

4. The method of claim 1, further comprising storing data indicative of said first angular position and said second angular position in a memory associated with said rotary displacement sensor.

5. The method of claim 1, wherein said rotary displacement sensor comprises an absolute sensor.

6. The method of claim 1, wherein said rotary displacement sensor comprises a magnetic displacement sensor.

7. The method of claim 1, wherein said rotary displacement sensor is an optical encoder.

8. The method of claim 1, further comprising recording data indicative of a third angular position of said shaft after power is applied to a fuel dispenser after an outage.

9. The method of claim 1, further comprising terminating said second fueling transaction if said data indicative of said first shaft angular position is not equal to said data indicative of said second shaft angular position.

10. A fuel flow meter, comprising:
    a shaft supporting at least one rotor;
    a rotary displacement sensor comprising at least one sensing element, a processor, and memory;
    said displacement sensor adapted to store first data indicative of an angular position of said shaft in said memory upon termination of a first fueling transaction;
    said displacement sensor further adapted to generate second data indicative of an angular position of said shaft upon initiation of a second fueling transaction;
    said processor adapted to compare said first and second data to determine whether fa difference exists.

11. A fuel flow meter as in claim 10, wherein said sensing element is selected from the group consisting of a magnetoresistive encoder, a hall effect encoder, an inductive encoder, a magnetic encoder, and an optical encoder.

12. A fuel flow meter as in claim 10, wherein said displacement sensor further comprises an encoder shaft coupled to said flow meter shaft.

13. A fuel flow meter as in claim 12, wherein removal of said displacement sensor from said flow meter causes one of said encoder shaft and said flow meter shaft to rotate relative to the other of said encoder shaft and said flow meter shaft.

14. A fuel dispenser, comprising:
    a control system having control system memory;
    internal fuel flow piping adapted for connection to a fuel flow path from a bulk storage tank to a nozzle;
    a fuel flow meter having a shaft, said fuel flow meter located along said piping;
    a rotary displacement sensor coupled to said fuel flow meter and in communication with said control system, said displacement sensor comprising displacement sensor memory;
    wherein said displacement sensor is adapted to determine data indicative of the angular position of said shaft; and
    wherein the data indicative of said angular position is stored in both said control system memory and said displacement sensor memory.

15. The fuel dispenser of claim 14, wherein said displacement sensor is adapted to determine data indicative of the angular position of said shaft at least upon termination of a first fueling transaction and upon initiation of a second fueling transaction.

16. The fuel dispenser of claim 15, wherein at least one of said fuel dispenser control system and said displacement sensor compares the data indicative of said shaft angular positions to determine whether a difference exists.

17. The fuel dispenser of claim 16, wherein both of said fuel dispenser control system and said displacement sensor compare said data indicative of said shaft angular positions to determine whether fraud has occurred.

18. The fuel dispenser of claim 16, wherein said fuel dispenser is disabled if said data indicative of said shaft angular position upon termination of said first fueling transaction is not equal to said data indicative of said shaft angular position upon initiation of said second fueling transaction.

19. The fuel dispenser of claim 15, wherein said fuel dispenser control system compares data indicative of said shaft angular position upon termination of said first fueling transaction stored in said control system memory to data indicative of said shaft angular position upon termination of said first fueling transaction stored in said displacement sensor memory to determine whether fraud has occurred.

20. The fuel dispenser of claim 14, wherein said displacement sensor is adapted to determine data indicative of the angular position of said shaft when power is applied to said fuel dispenser after an outage.

21. A fuel flow meter, comprising:
a shaft supporting at least one rotor;
a rotary displacement sensor comprising a processor and memory;
said displacement sensor comprising an optical encoder adapted to output an expected number of position signals per revolution of said shaft and one or more reference signals per revolution of said shaft;
said displacement sensor adapted to store data indicative of said position signals and said one or more reference signals in memory;
said displacement sensor adapted to compare a first number of position signals received after receiving a reference signal before termination of a first fueling transaction and a second number of position signals received after initiation of a second fueling transaction to said expected number of position signals to determine whether fraud has occurred.

22. The fuel flow meter of claim 21, wherein said second fueling transaction is terminated if said second number of position signals, when subtracted from said expected number of position signals, is not within one of said first number of position signals.

23. The fuel flow meter of claim 21, wherein said optical encoder comprises a shaft-mounted disc.

24. The fuel flow meter of claim 21, wherein said optical encoder is an absolute encoder.

25. A method for detecting fraud caused by tampering with a fuel flow meter, comprising the steps of:
providing a fuel flow meter for measuring the flow of liquid fuel, said flow meter having a housing and at least one shaft supporting a rotor;
providing said flow meter with a rotary displacement sensor having a housing and a shaft; and
providing a first coupling between said flow meter shaft and said rotary displacement sensor shaft;
wherein said first coupling is operative to cause one of said rotary displacement sensor shaft and said flow meter shaft to rotate relative to the other of said rotary displacement sensor shaft and said flow meter shaft upon removal of said rotary displacement sensor from said flow meter housing.

26. The method of claim 25, further comprising providing a second coupling between said flow meter housing and said rotary displacement sensor housing.

27. The method of claim 26, wherein said second coupling prevents rotation of said rotary displacement sensor housing relative to said flow meter housing upon removal of said rotary displacement sensor from said flow meter housing.

28. The method of claim 26, wherein said second coupling comprises a socket defined in said flow meter housing adapted to receive a protrusion of said displacement sensor housing.

29. The method of claim 26, wherein said second coupling prevents access to said flow meter shaft and said rotary displacement sensor shaft when said flow meter housing is coupled with said rotary displacement sensor housing.

30. The method of claim 25, wherein said first coupling comprises at least one pin on one of said displacement sensor shaft and said flow meter shaft configured to engage with at least one slot on the other of said rotary displacement sensor shaft and said flow meter shaft.

31. The method of claim 30, wherein said at least one slot is helical.

32. The method of claim 25, wherein said first coupling comprises a one-way clutch.

* * * * *

UNITED STATES PATENT AND TRADEMARK OFFICE
CERTIFICATE OF CORRECTION

PATENT NO.       : 8,757,009 B2                                        Page 1 of 1
APPLICATION NO.  : 13/313894
DATED            : June 24, 2014
INVENTOR(S)      : Jennings It is certified that error appears in the above-identified patent and that said Letters Patent is hereby corrected as shown below:

In the Claims

Claim 10, column 14, line 30, please delete "fa" and replace with the word --a--.

Signed and Sealed this
Second Day of December, 2014

Michelle K. Lee
*Deputy Director of the United States Patent and Trademark Office*